C. W. BECK.
PROTECTOR AND LUBRICANT RETAINER FOR THE JOINTS OF THE STEERING MECHANISM AND OTHER PARTS OF AN AUTOMOBILE.
APPLICATION FILED MAY 1, 1911. RENEWED AUG. 18, 1916.
1,221,015. Patented Apr. 3, 1917.
2 SHEETS—SHEET 1.
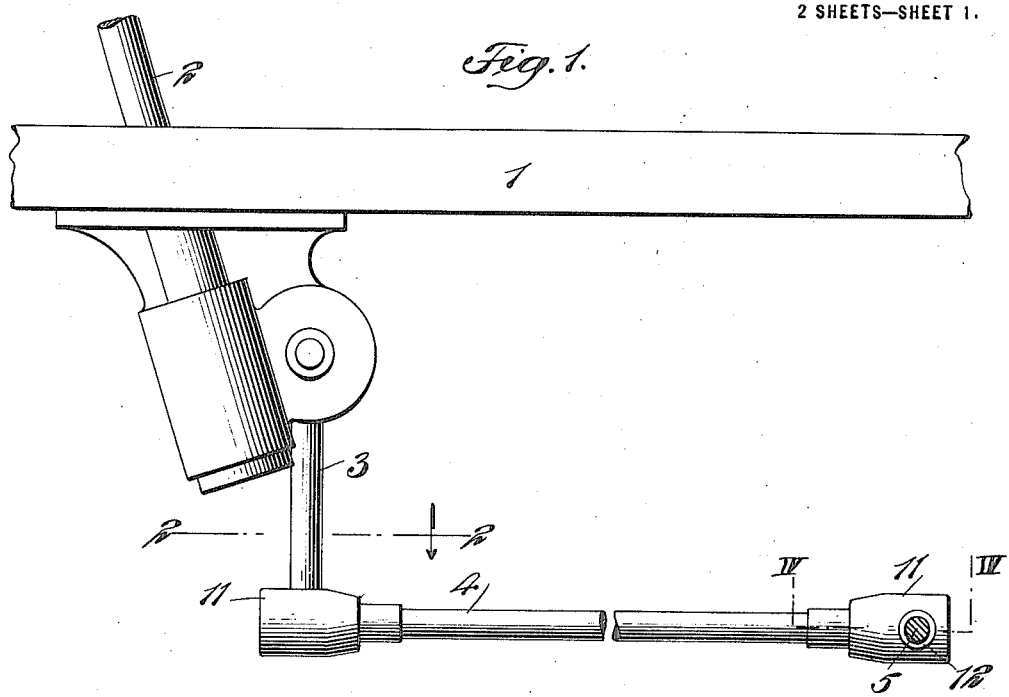
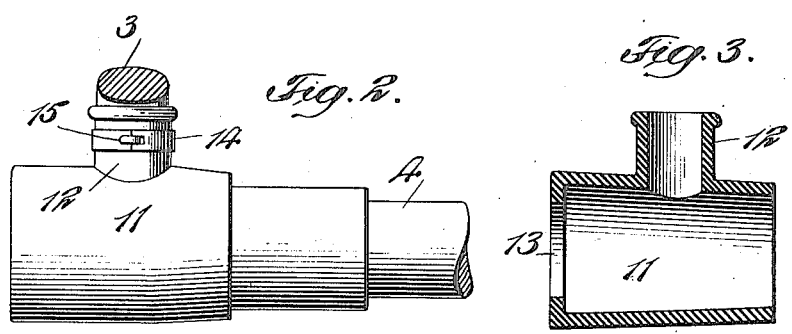
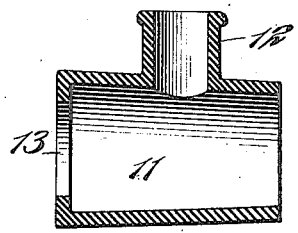
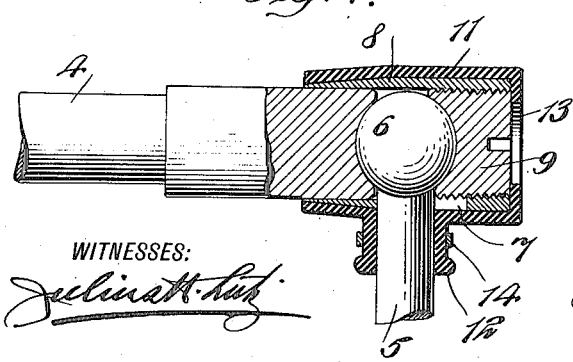
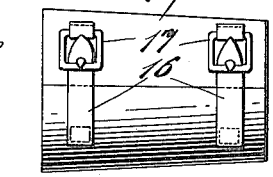
WITNESSES:
INVENTOR
Charles W. Beck
BY
Davis & Davis
his ATTORNEYS

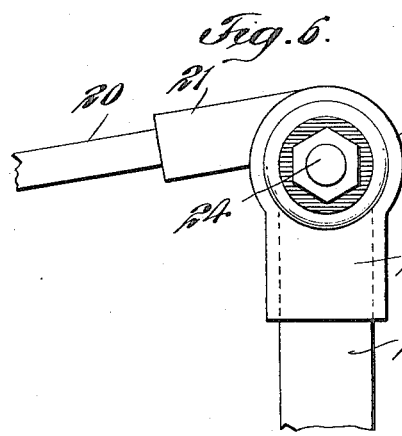
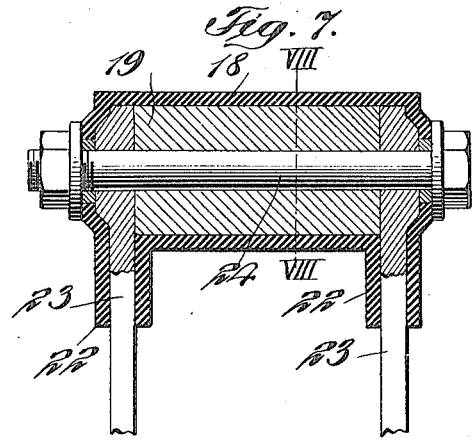
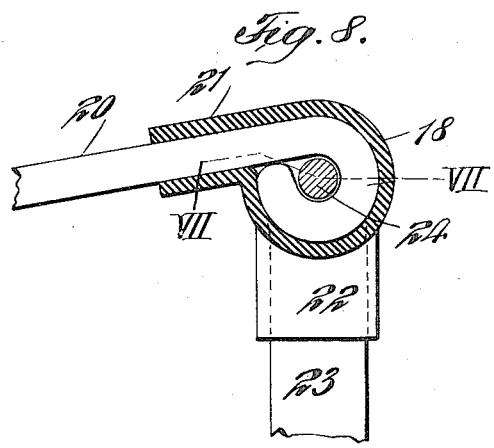
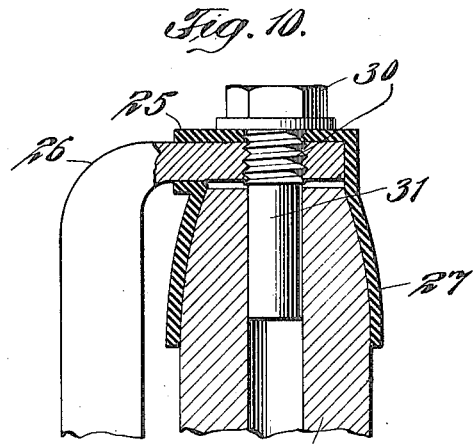
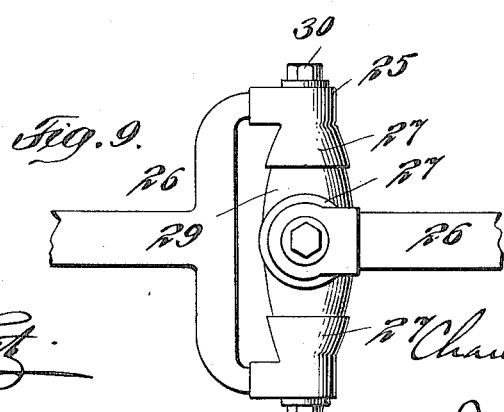

UNITED STATES PATENT OFFICE.

CHARLES W. BECK, OF ROCKVILLE CENTER, NEW YORK, ASSIGNOR, BY MESNE ASSIGNMENTS, TO THE BECK-FROST CORPORATION, OF DETROIT, MICHIGAN, A CORPORATION OF MICHIGAN.

PROTECTOR AND LUBRICANT-RETAINER FOR THE JOINTS OF THE STEERING MECHANISM AND OTHER PARTS OF AN AUTOMOBILE.

1,221,015.      Specification of Letters Patent.      Patented Apr. 3, 1917.

Application filed May 1, 1911, Serial No. 624,442. Renewed August 18, 1916. Serial No. 115,678.

*To all whom it may concern:*

Be it known that I, CHARLES W. BECK, a citizen of the United States, residing at Rockville Center, county of Nassau, and State of New York, have invented certain new and useful Improvements in Protectors and Lubricant-Retainers for the Joints of the Steering Mechanism and other Parts of an Automobile, of which the following is a complete specification, reference being had therein to the accompanying drawings, in which—

Figure 1 is a side elevation showing the protector applied to the joints at the ends of the fore-and-aft rod of an automobile steering apparatus;

Fig. 2 a horizontal sectional view on the line 2—2 of Fig. 1, showing one end of the fore-and-aft rod on a slightly larger scale;

Fig. 3 a longitudinal sectional view of the protector detached;

Fig. 4 a longitudinal sectional view on line IV—IV of Fig. 1 of one end of the fore-and-aft rod showing the protector in position thereon;

Fig. 5 a bottom view of the protector of slightly different form;

Fig. 6 a side elevation of a spring connection fitted with my protecting device;

Fig. 7 a vertical transverse sectional view thereof on the line VII—VII of Fig. 8;

Fig. 8 a vertical sectional view on the line VIII—VIII of Fig. 7;

Fig. 9 a detail plan view of the universal joint showing the connection thereof fitted with my protecting device; and Fig. 10 a horizontal sectional view of the form of device shown in Fig. 9.

The exposed joints between the moving or movable parts of an automobile, such for instance, as between the parts of the steering mechanism, universal joints and the hinge connections of the springs, soon become filled with dirt and dust and sand, resulting in the grinding and cutting of such joints and connections to such an extent as to render them noisy and unsafe; and some of such joints become so clogged with dirt as to render them stiff and practically inoperative. Various expedients have been resorted to protect these joints, most of which have been inefficient and unsightly.

It is the main object of this invention to provide a covering for these joints which will protect them by excluding dust, sand and water therefrom and effectually retain therein a lubricant. These joints are more or less open and are of such nature that rigid dust-excluding lubricant-retaining means cannot be successfully applied to them. And the fact that they are more or less open and exposed to dust and the weather renders it extremely desirable that some form of protector be applied thereto.

Another object of the invention is to provide a covering or protector having a part adapted to receive one of the members or connected parts and an integral extension adapted to fit around the other connected member or part, said two portions of the protector being flexible and elastic to permit them to be expanded over the two parts and to bridge the joint to be protected.

Another object of the invention is to provide a seamless one-piece protector of flexible and elastic material adapted to be expanded to receive the two parts and to retain the lubricating material between the parts of the joint. By forming the device of elastic material it will closely embrace the parts on both sides of the joint and effectually exclude dust and dirt therefrom and retain the lubricating material.

While I have shown and described my protector especially with reference to its use as a covering for the joints between the various steering rods, universal joints and spring hinges of an automobile it is to be understood that it may be used in other positions and on other joints for the purpose of retaining the lubricant and excluding dust and dirt.

Referring to the various parts by numerals 1 designates a portion of a frame of an automobile, 2 the steering rod or post, 3 the steering arm through which the motion of the steering post is communicated to the fore-and-aft connecting rod 4. This fore-and-aft rod is connected by means of ball and socket joints to the steering arm 3 and to the crank arm 5 of the steering knuckle of one of the front wheels. The steering arm and the crank of the steering knuckle are provided at their ends with balls 6. These balls are each adapted to be passed through an aperture 7 in the end piece 8 of the fore-and-aft rod to be retained therein by an adjusting screw 9 threaded in the end piece 8. To permit of a free movement between the steering arm and the crank arm and the ends of the fore-and-aft rod, and to permit of the passage of the ball 6 into the steering rod, the apertures 7 must be of considerable size. If these apertures are not covered, dirt and dust will accumulate within said end pieces rendering the operation of the steering apparatus difficult and rapidly wearing out the balls 6 and the contacting faces of the sockets and the adjusting screws 9. It is also manifest that if a lubricant is used it may readily escape from the joints, and whatever remains therein will soon be full of dirt and grit. To cover these apertures without in the least interfering with the operation of the steering apparatus I provide the tubular elastic protector having a main part 11, which is adapted to fit over the end of the fore-and aft rod, and an integral tubular extension 12 designed to receive the adjoining portion of a connected member of the steering apparatus. This tubular extension is formed at right angles to the main body of the protector and is of sufficient flexibility to permit it to be expanded over the ball 6 on the end of the rod 5, or over the corresponding ball on the end of the rod 3. It is small enough in diameter however, to cause it to closely embrace the rod carrying the ball. It will be readily seen that as the extension 12 is flexible and elastic, and the body portion of the protector 11 is likewise elastic, the steering crank or other connected member may vary its angular position with respect to the fore-and-aft rod without in the least separating it from the extension 12 and without so stretching said extension as to permit the entrance of sand or dust within the protector.

The outer end of the main body part of the protector is provided with an annular inwardly extending flange 13 which fits over the end of the fore-and-aft rod as indicated clearly in the drawings.

To clamp the extension 12 to the steering arm, or to the steering knuckle crank, I provide a flexible, preferably brass, band 14 which surrounds said extension and clamps the same to the steering arm. The ends of this clamp may be locked together in any suitable manner, one form of locking means being shown in Fig. 2. In this form one end of the clamping band is provided with a slot adapted to receive a tongue 15 formed on the opposite end of said band. If desired a clamping band 14 may be dispensed with and the protectors rigidly cemented in place by shellac, or other cementing material placed between the protector and the parts which it embraces.

In applying the device the ball 6 is first forced inwardly through the extension 12. The inner end of the protector is then placed part way on the end of the fore-and-aft rod. The entire device must now be expanded sufficiently to permit the ball to be passed through the aperture 7, after which the main part of the device is forced on the fore-and-aft rod and the retaining plug 9 screwed in place. The retaining plug 9 is usually retained in place by means of a cotter pin, not shown in the drawings. In order to permit the plug 9 to be screwed into the end of the fore-and-aft rod, or to be removed therefrom, the flange 13 and the adjoining end of the protector must be expanded and folded back on the fore-and-aft rod. This will free the plug so that it may be inserted or removed from the end of the rod.

It will be readily seen that the extension 12 will permit the arm 5 (or the rod 3) to assume almost any angular position with relation to the fore-and-aft rod without permitting the least bit of dust or sand to enter the joint. The flexibility of the protector and the extension 12 permits this without separating the said extension from the steering rod. The clamping means is employed as an extra precaution so that the extension 12 will be at all times held closely against the bar carrying the joint ball. It is essential that there shall be no joints between the extension 12 and the body of the protector; and it is also essential that there shall be no space between the rod carrying the joint ball and the extension 12 during any position of the steering apparatus. I accomplish this by the employment of a flexible and elastic protector preferably made of molded rubber, said rubber being soft and elastic but of sufficient thickness to withstand the strain for which it is designed.

In Fig. 5 is shown a protector formed of a single piece of molded flexible rubber split longitudinally along its under side to adapt it to be readily placed over the end of the fore-and-aft rod, said split protector being provided with a pair of straps 16 adapted to engage buckles 17. By tightening these straps the rubber will be securely held in position over the joint.

In Figs. 6, 7, and 8 the protector is shown as applied to the hinge joint between a spring and its support. This form of device consists of a main tubular part 18 to receive the eye 19 of the spring 20, said main portion being provided with an outwardly-extending broad flat tubular part 21 adapted to extend along the spring a suitable distance, as shown clearly in Fig. 8. At each end of the main portion are formed extensions 22 which are flat and tubular and are designed to receive the links 23 of the spring suspending means. The extensions 22 are formed integral with the main body portion of the protector and are flexible and elastic to permit the ends of the spring supporting links to be forced into them. The outer sides of the extensions 22 are apertured to permit of the passage of the spring connecting bolt 24, the head of said bolt and the nut on the other end thereof, serving as a means for clamping the outer sides of the extensions 22 to said links, the outer sides of said extensions serving as washers to prevent the entrance of dirt and dust and water in the bolt apertures in the links, and along the bolt into the eye of the spring. In placing this form of protector in position the eye of the spring is first forced inwardly through the flexible extension 21 until it fits within the main portion 18 of the protector. The ends of the supporting links are then forced inwardly through the tubular extensions 22 until their bolt apertures register with the aperture in the eye 19 of the spring. The retaining bolt may then be inserted through the protector, the links 23, and the eye of the spring, the head of the bolt and the nut serving as means to clamp the protector in place.

It will thus be seen that the protector may be readily applied to the spring joints and that when so applied it will effectually exclude all dust, dirt and water from said joint, and will also act as a lubricant retaining means.

In Figs. 9 and 10 the device is shown as applied to a universal joint. It is shown as a protector for one of the joints between the members of the universal joint, but it is to be understood that it is to be applied to all of the joints thereof in order to retain lubricant within said joints and to exclude dirt and water therefrom. As shown in these figures the device consists of a cup-shaped portion 25 adapted to receive one end of one of the yokes 26 of the universal joint. This cup-shaped portion 25 is formed with a tubular extension 27 adapted to receive one end 28 of the casting 29. This casting is in the form of a cross having four arms at right angles, the yoke arms being connected to the outer ends of these cross arms. Connecting pins 30 are screwed in the ends of the yoke arms and have non-threaded portion 31 fitting in the ends of the cross arms. Each of these pins is passed through a suitable aperture in the outer side of the cup portion 25 of the protector, the head of the pin closing said aperture and clamping the protector in place against the yoke arm. It will thus be seen that the protector is held in position against accidental displacement and serves as a covering means for excluding dirt and water from the joint between the yoke arm and the casting. The protector is preferably made of rubber molded into shape and without seams, and thin enough to be expanded over and to grip the parts tightly. It is, of course, to be understood that if desired the rubber may be cemented to the metal parts by means of shellac or any other suitable cementing material.

From the foregoing it is manifest that I provide a very simple device which will exclude every particle of dust and sand from the protected joints and retain the lubricant therein, and which when in position, will be neat in appearance.

Having thus fully described my invention, what I claim as new and desire to secure by Letters Patent is:

1. A joint protector comprising a molded one-piece flexible elastic tubular device having a main portion and a subordinate portion extending outwardly at an angle to the main portion, said tubular elastic portions being normally smaller than the parts to be covered by them, whereby said tubular device will yieldingly clamp itself about the parts to be protected and will seal the joint between the connected parts.

2. The combination of a fore-and-aft rod, a steering rod connected thereto and a joint protector fitting closely over the fore-and-aft rod and the steering rod and comprising a molded one-piece tubular device having a main tubular portion adapted to receive the fore-and-aft rod, and a subordinate portion extending outwardly at an angle to the main portion and adapted to receive the steering rod, said tubular portions being normally smaller than the parts to be covered by them, whereby said portions will yieldingly clamp themselves in position and will seal the joint between the fore-and-aft rod and the steering rod.

3. A joint protector comprising a molded one-piece flexible elastic tubular device having a main portion and a flexible elastic integral tubular extension projecting a considerable distance outwardly from the main portion and permanently molded to form.

4. The combination with transversely jointed members detachably connected together, of a joint protector comprising transversely arranged socket portions engageable around the transversely arranged members respectively, said protector being formed of elastic material, and the walls of the socket portions thereof being continuous.

5. The combination with transversely jointed members detachably connected together, of a joint protector comprising transversely arranged socket portions engageable around the transversely arranged members respectively, said protector being formed of elastic material and the walls of the socket portions thereof being continuous, and means at the end of one of said socket portions for connecting said transversely arranged members together, there being an opening in said end of said socket portion positioning the connecting means in position to be accessible.

6. A joint protector and lubricant retainer comprising a molded one-piece flexible and elastic tubular device having a main tubular portion and a subordinate tubular portion extending outwardly at an angle to the main portion, the walls of said portions being continuous, said subordinate portion having side walls which are adapted to closely engage the part to be received by it to form a dust and moisture-proof joint therewith, the two portions being flexibly connected together, whereby said flexible connection will permit the two portions of the protector to yield and move with the parts covered by them without distorting the outer free end of the subordinate portion.

7. The combination with two transversely arranged members connected together for relative angular movement, of a joint protector for the connection between said members comprising a body portion surrounding one of said members at the connection between said members, and a flexible neck portion surrounding the other member and extending at an angle to said body portion, the neck portion being of sufficient length to permit the outer portion of said neck to remain in close contact about said second member during the relative movement of said members in transverse planes.

8. The combination with two transversely arranged members connected together for relative angular movement, of a joint protector for the connection between said members comprising a flexible body portion surrounding one of said members and the connection therebetween, and a flexible neck portion formed integral with the body portion and extending at an angle thereto, said flexible neck portion surrounding the other of said members and being comparatively long to permit the outer portion of said neck to remain in close contact about said second member during the relative movement of said members in transverse planes.

In testimony whereof I hereunto affix my signature in the presence of two witnesses.

CHARLES W. BECK.

Witnesses:
WM. R. DAVIS,
T. R. MILLER.